T. H. MATHEWS.
Bee Hive.
No. 43,921.
Patented Aug. 23, 1864.
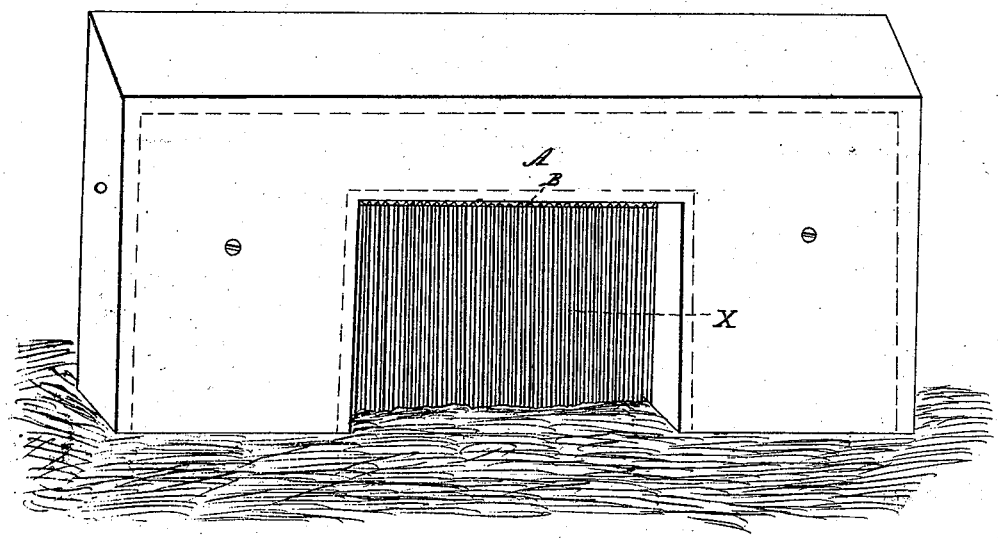
Witnesses:
John C. Bagley
James McCrosky
Inventor:
Thomas H. Mathews

UNITED STATES PATENT OFFICE.

THOMAS H. MATHEWS, OF RUSHVILLE, ILLINOIS.

IMPROVEMENT IN BEE-HIVES.

Specification forming part of Letters Patent No. 43,921, dated August 23, 1864.

*To all whom it may concern:*

Be it known that I, THOMAS H. MATHEWS, of Rushville, in the county of Schuyler and State of Illinois, have invented a new and Improved Mode of Protecting Bee-Hives from the Bee Miller or Moth; and I do hereby declare that the following is a full and exact description thereof, reference being had to the accompanying drawings, and to the letters of reference marked thereon.

The nature of my invention consists in providing a metallic curtain of small brass rods, entirely covering the bee-entrance to the hives, through which the bees will pass and repass freely, and through which the bee moth or miller will not pass, and by that means excluding the moth or miller from the hive.

To enable others to make and use my invention, I will proceed to describe its construction and operation.

I construct the hive in any of the ordinary forms, with the bee-doors pierced in a plane surface, such surface at least five inches wide and two and one-half inches high. Over the bee-doors I screw on a strip of board five and one-half inches long, two and one-half inches wide, and one-half inch thick, (see letter A in drawing,) so as to cover the bee-doors. I then cut out of the under edge of the strip an aperture three inches long and one and one-half inch wide, thus uncovering the bee-doors. Along the upper edge of this aperture I place a rod or wire one-eighth of an inch in diameter, (marked B in drawing.) On this horizontal wire I suspend fine rods of brass wire, placed so close together as to form a curtain the whole length of the rod B, inside the aperture, and covering the bee-entrances to the hive. These fine brass rods each hang separately on the rod B, and extend nearly to the floor of the hive, yet not touching the floor, each one of the fine rods swinging clear, barely touching each other. These fine rods forming the curtain are marked X in the drawings.

What I claim as my invention, and desire to secure by Letters Patent, is—

The application of the metallic curtain, as above described, to the bee-entrances of the bee-hive, through which the bees will pass freely, and through which the bee moth or miller will not pass, and thus preventing the moth or miller from depositing its eggs in the hive.

THOMAS H. MATHEWS.

Witnesses:
JOHN C. BAGLEY,
JAMES McCUSKY.